(12) United States Patent
Ichihara et al.

(10) Patent No.: US 8,387,593 B2
(45) Date of Patent: Mar. 5, 2013

(54) EGR FLOW RATE CONTROL APPARATUS OF INTERNAL COMBUSTION ENGINE

(75) Inventors: Takanobu Ichihara, Tsuchiura (JP);
Kazuhiko Kanetoshi, Hiatchinaka (JP);
Kouzou Katogi, Hitachi (JP); Hiroaki Hoshika, Hitachiomiya (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 306 days.

(21) Appl. No.: 12/829,080

(22) Filed: Jul. 1, 2010

(65) Prior Publication Data
US 2011/0017179 A1  Jan. 27, 2011

(30) Foreign Application Priority Data

Jul. 27, 2009  (JP) .................................. 2009-174693

(51) Int. Cl.
  *F02B 47/08* (2006.01)
  *F02M 25/07* (2006.01)
  *B60T 7/12* (2006.01)
  *G05D 1/00* (2006.01)
  *G06F 7/00* (2006.01)
  *G06F 17/00* (2006.01)

(52) U.S. Cl. .................................. 123/568.21; 701/108
(58) Field of Classification Search ............. 123/568.21, 123/568.12, 568.15
See application file for complete search history.

(56) References Cited

U.S. PATENT DOCUMENTS

| 7,270,118 | B2 * | 9/2007 | Yamaoka et al. | ............. 123/672 |
| 2003/0041845 | A1 * | 3/2003 | Akao et al. | ............. 123/568.16 |

FOREIGN PATENT DOCUMENTS

| EP | 1 643 103 A2 | 4/2006 |
| EP | 1 643 103 A3 | 4/2006 |
| EP | 1 914 415 A2 | 4/2008 |
| EP | 1 950 406 A2 | 7/2008 |
| JP | 2006-214275 A | 8/2006 |
| JP | 2006214275 A * | 8/2006 |
| JP | 2008-69690 A | 3/2008 |

OTHER PUBLICATIONS

Japanese Office Action dated Oct. 18, 2011 (three (3) pages).
European Search Report dated Feb. 25, 2011 (Three (3) pages).

* cited by examiner

*Primary Examiner* — Stephen K Cronin
*Assistant Examiner* — Pedro Gomez
(74) *Attorney, Agent, or Firm* — Crowell & Moring LLP

(57) ABSTRACT

An EGR flow rate control apparatus of an internal combustion engine is provided that can correct with high accuracy an EGR gas flow rate measured by a gas flow rate measurement apparatus in an EGR passage and control with high accuracy a gas flow rate regulating valve to reduce discharge amounts of PM and NOx in exhaust gases. An EGR flow rate control apparatus 10 of an internal combustion engine includes a gas flow rate correction unit 45 that corrects the EGR gas flow rate based on a first operating state parameter relating to pressure fluctuations of the intake pipe or exhaust pipe of the internal combustion engine and a second operating state parameter relating to a flow channel resistance of the EGR flow channel.

5 Claims, 13 Drawing Sheets

(a)            (b)

EGR FLOW RATE CONTROL APPARATUS OF INTERNAL COMBUSTION ENGINE

BACKGROUND OF THE INVENTION

1. Field of the Invention

The present invention relates to an EGR flow rate control apparatus of an internal combustion engine for measuring an EGR gas flow rate in an EGR flow channel and controlling an EGR gas flow rate, and more particularly to an EGR flow rate control apparatus of an internal combustion engine that is suitable for reducing NOx and PM (soot) in exhaust gases of an internal combustion engine.

2. Background Art

In recent years, among various kinds of engines, a hopeful view is being taken of diesel engines and ignition lean-burn engines with regard to enhancing the fuel consumption of internal combustion engines. However, compared to other engines, the exhaust gases of diesel engines and lean-burn engines tend to include a large amount of NOx (nitrogen oxides). Diesel engines also discharge PM (soot) in addition to NOx. In such engines, in order to decrease the amount of NOx or PM included in the exhaust gases it is effective to lower the fuel combustion temperature, and exhaust gas recirculation (EGR) control is conventionally performed that carries out combustion control that returns a portion of the exhaust gas to the intake side via an EGR flow channel that communicates an exhaust pipe with an intake pipe.

For this purpose, an EGR flow rate control apparatus has been proposed as disclosed, for example, in JP Patent Publication (Kokai) No. 2006-214275A, in which a sensor (EGR flow sensor) that measures an EGR gas flow rate is disposed in an EGR passage and the control apparatus controls a lift amount (degree of opening) of the EGR control valve (EGR valve) so that a measured value obtained by the EGR flow sensor becomes a target value that is calculated by the control apparatus.

SUMMARY OF THE INVENTION

Since the EGR passage is a gas flow channel that connects an exhaust passage of an exhaust pipe with an intake passage of an intake pipe, the exhaust gas of the EGR passage flows from the exhaust side to the intake side in accordance with a pressure difference between the exhaust pressure and the intake manifold internal pressure (intake pressure). Further, the actual flow rate (EGR gas flow rate) of exhaust gas flowing through the EGR passage fluctuates (pulsates) due to the influence of exhaust pipe pressure fluctuations and fluctuations in the intake manifold internal pressure (intake pipe pressure fluctuations).

However, for example, when using the EGR flow rate control apparatus disclosed in JP Patent Publication (Kokai) No. 2006-214275A, even when an error in measurement of the EGR gas flow rate caused by such pulsations is corrected according to the measured value or the like, in some cases the measurement error can not be adequately corrected.

According to investigations carried out by the inventors of the present invention, it was confirmed that the influence of fluctuations in the exhaust pressure is strongly received in the EGR passage on the exhaust pipe side with respect to the EGR valve, and the amplitude of pulsations in the EGR gas flow rate on the exhaust pipe side with respect to the EGR valve is large compared to the amplitude of pulsations in the EGR passage on the intake pipe side thereof.

It was thus found that a measurement error of an EGR flow sensor increases when the EGR flow sensor is disposed on the exhaust pipe side with respect to the EGR valve. The influence of fluctuations in the exhaust pressure is alleviated in the EGR passage on the intake pipe side with respect to the EGR valve due to flow channel resistance of an EGR valve element part, and therefore the amplitude of pulsations in the EGR gas flow rate decreases compared to the exhaust pipe side. It was thus found that disposing an EGR flow sensor in the EGR passage on the intake pipe side with respect to the EGR valve is effective for reducing flow rate measurement errors of an EGR flow sensor.

Further, according to experimental evaluations of the inventors it was found that, in an EGR flow rate control apparatus in which an EGR flow sensor is disposed on an intake pipe side with respect to an EGR valve, although the pulse amplitude of the EGR gas flow rate at the measurement position of the EGR flow sensor decreases compared to when the EGR flow sensor is disposed on the exhaust pipe side, in some cases measurement errors of the EGR flow sensor increase depending on the lift amount (degree of opening) of the EGR valve. As a result, in some cases the amount of PM or NOx in the exhaust gases increases when the lift amount of the EGR valve is changed.

The inventors carried out studies regarding the reasons measurement errors of an EGR flow sensor increase depending on the lift amount of an EGR valve in a test engine. The studies showed that in a passage on a downstream side (intake pipe side) of an EGR valve in which an EGR flow sensor is disposed, when a lift amount of the EGR valve is small when the engine rotates under specific conditions, the pulse frequency of the EGR gas flow rate at the sensor measurement position is higher than when the lift amount is large.

More specifically, it was found that the pulse frequency of the EGR gas flow rate changes to a large degree due to a change in the lift amount of the EGR valve. As a result, it was newly found that measurement errors of an EGR flow sensor are increased by fluctuations to a high frequency region of a pulse frequency that accompanies changes in the lift amount of the EGR valve.

Meanwhile, the EGR passage is caused to vibrate by exhaust pipe pressure fluctuations and intake pipe pressure fluctuations from both ends of the passage. At this time, a phase difference arises between the exhaust pipe pressure fluctuations and the intake pipe pressure fluctuations, and high frequency pulsations are liable to be generated by the interference of these pressure fluctuations. The studies of the inventors showed that the flow channel resistance of a diaphragm portion of an EGR valve is changed by changes in the lift amount (degree of valve opening) of the EGR valve, and thus the resonance frequency of the EGR passage changes. Further, it was found that when the lift amount of the EGR valve is small, pressure fluctuations increase in the passage downstream of the EGR valve and the high frequency pressure fluctuations are difficult to attenuate.

Due to the above factors, in the EGR passage downstream of the EGR valve, the pulse frequency fluctuates to a large degree to the high frequency side when the EGR valve lift amount changes. In contrast, in the intake passage (upstream of throttle valve), since one end of the passage opens to the atmosphere, it is difficult for high frequency pressure fluctuations to arise, and almost no fluctuations in the pulse frequency arise even when the degree to which the throttle valve is opened changes. Consequently, it is considered that the reason the pulse frequency of the EGR gas flow rate is changed to a large degree to the high frequency side by a change in the lift amount of the EGR valve is due to a phenomenon that is characteristic of the passage downstream of the EGR valve (intake pipe side).

The inventors also studied regarding the relationship between a pulse frequency of the EGR gas flow rate and a measurement error of the EGR flow sensor. The aforementioned EGR flow sensor that measures the flow of EGR gas measures a gas flow rate at a position at which the sensor is disposed inside the EGR passage. Although the gas flow rate generally varies according to a cross-sectional direction position in the EGR passage, the flow rate of gas flowing through the EGR passage overall (EGR gas flow rate) is measured as an EGR gas flow rate using a flow rate measurement value at the position of the EGR flow sensor on the basis that there is a constant correlation between the velocity of gas flowing through the EGR passage overall and the gas flow velocity at the sensor position.

According to the studies of the inventors it was newly found that the relationship between the gas flow rate flowing in the EGR passage overall and the gas flow rate at the measurement position of the EGR flow sensor is not constant due to changes in the pulse frequency of the EGR gas, and that the relationship fluctuates according to the pulse frequency of the EGR gas.

It was thus found that in an EGR flow rate control apparatus in which an EGR flow sensor is disposed on an intake pipe side with respect to an EGR valve, the pulse frequency of the EGR gas flow rate is changed by a change in a lift amount of the EGR valve and an error occurs in a flow rate measurement value of the EGR flow sensor.

An object of the present invention is to provide an EGR flow rate control apparatus of an internal combustion engine that, when it is premised that an EGR (gas) flow sensor is disposed in an EGR passage on a downstream (intake pipe side) side of an EGR valve, under an environment which is characteristic to the aforementioned EGR passage downstream of the EGR valve, reduces measurement errors of the EGR flow sensor that are attributable to fluctuations in the pulse frequency of the EGR gas flow rate caused by lift amount changes (changes in the degree of opening) of the EGR valve, to thereby improve the control accuracy of the EGR gas flow rate and reduce the amount of PM or NOx in exhaust gases.

An EGR flow rate control apparatus of an internal combustion engine according to the present invention for solving the above problems comprises: an EGR flow channel that communicates an exhaust pipe with an intake pipe; a gas flow rate regulating valve that is installed in the EGR flow channel and regulates an EGR gas flow rate; and a gas flow rate measurement apparatus that is installed on an intake pipe side with respect to the gas flow rate regulating valve in the EGR flow channel, and measures the EGR gas flow rate flowing through the EGR flow channel; wherein the EGR flow rate control apparatus comprises gas flow rate correction means that corrects the EGR gas flow rate based on a first operating state parameter relating to pressure fluctuations in the intake pipe or the exhaust pipe of the internal combustion engine and a second operating state parameter relating to a flow channel resistance of the EGR flow channel.

According to the present invention, measurement errors of a gas flow rate measurement apparatus that accompany changes in the degree of opening of a gas flow rate regulating valve can be reduced. Further, since the EGR gas flow rate can be controlled with high accuracy, discharge amounts of PM or Nox in exhaust gases can be decreased.

More preferably, in the EGR flow rate control apparatus of an internal combustion engine according to the present invention, the gas flow rate correction means corrects the EGR gas flow rate by using at least one member of the group consisting of a number of revolutions of the internal combustion engine, a load of the internal combustion engine, a target torque, a fuel injection amount, an intake pipe pressure, a degree of throttle valve opening, and an exhaust pipe pressure as the first operating state parameter, and using at least one member of the group consisting of a degree of opening of the gas flow rate regulating valve, the EGR gas flow rate, a number of revolutions of the internal combustion engine, a load of the internal combustion engine, and a target torque as the second operating state parameter.

More preferably, in the EGR flow rate control apparatus of an internal combustion engine according to the present invention, the gas flow rate correction means corrects the EGR gas flow rate by using as the first operating state parameters a number of revolutions of the internal combustion engine and one member of the group consisting of a load of the internal combustion engine, a fuel injection amount, and a target torque, and using a degree of opening of the gas flow rate regulating valve as the second operating state parameter.

According to another aspect, an EGR flow rate control apparatus of an internal combustion engine according to the present invention comprises an EGR flow channel that communicates an exhaust pipe with an intake pipe; a gas flow rate regulating valve that is installed in the EGR flow channel and regulates an EGR gas flow rate; and a gas flow rate measurement apparatus that is installed on an intake pipe side with respect to the gas flow rate regulating valve in the EGR flow channel, and measures the EGR gas flow rate flowing through the EGR flow channel; wherein the EGR flow rate control apparatus comprises gas flow rate correction means that corrects the EGR gas flow rate based on a pulse frequency of the EGR gas flow rate or an amount of change over time in the EGR gas flow rate.

According to the present invention, a measurement error of a gas flow rate measurement apparatus due to a pulse frequency of an EGR gas flow rate or an amount of change over time in an EGR gas flow rate can be reduced. It is thereby possible to always measure an EGR gas flow rate with high accuracy even when the gas flow rate fluctuates due to pulsating of EGR gas as the result of variations in the characteristics of components of a gas flow rate regulating valve or the like, or variations in the shape of a cam of an engine or the like. Further, an EGR gas flow rate can be measured with high accuracy, and discharge amounts of PM or NOx in exhaust gases can be reduced.

More preferably, in the EGR flow rate control apparatus of an internal combustion engine according to the present invention, when the pulse frequency of the EGR gas flow rate is a frequency that is lower than a predetermined frequency, the gas flow rate correction means increases a correction amount of an EGR gas flow rate in a direction in which the EGR gas flow rate increases in accordance with a rise in the pulse frequency of the EGR gas flow rate, and when the pulse frequency of the EGR gas flow rate is a frequency that is higher than the predetermined frequency, the gas flow rate correction means decreases the correction amount of an EGR gas flow rate in a direction in which the EGR gas flow rate increases in accordance with a rise in the pulse frequency of the EGR gas flow rate.

According to another aspect, an EGR flow rate control apparatus of an internal combustion engine according to the present invention comprises an EGR flow channel that communicates an exhaust pipe with an intake pipe; a gas flow rate regulating valve that is installed in the EGR flow channel and regulates an EGR gas flow rate; and a gas flow rate measurement apparatus that is installed on an intake pipe side with respect to the gas flow rate regulating valve in the EGR flow channel, and measures the EGR gas flow rate flowing through the EGR flow channel; wherein the EGR flow rate control apparatus comprises gas flow rate correction means that corrects the EGR gas flow rate based on operating state parameters including at least a number of revolutions of the internal combustion engine.

According to the present invention, an EGR gas flow rate measured by a gas flow rate measurement apparatus in an EGR passage can be measured with high accuracy, and a gas flow rate regulating valve can be controlled with high accuracy. As a result, discharge amounts of PM or NOx in exhaust gases can be reduced.

DETAILED DESCRIPTION OF THE PREFERRED EMBODIMENTS

First Embodiment

Several embodiments are described below in which the EGR flow rate control apparatus of an internal combustion engine of the present invention is applied to a diesel engine to enable favorable control of an EGR gas flow rate flowing through an EGR flow channel. The control apparatus of the internal combustion engine according to these embodiments is not limited to a diesel engine, and is also applicable to a gasoline engine that controls an EGR gas flow rate.

Figure 1:
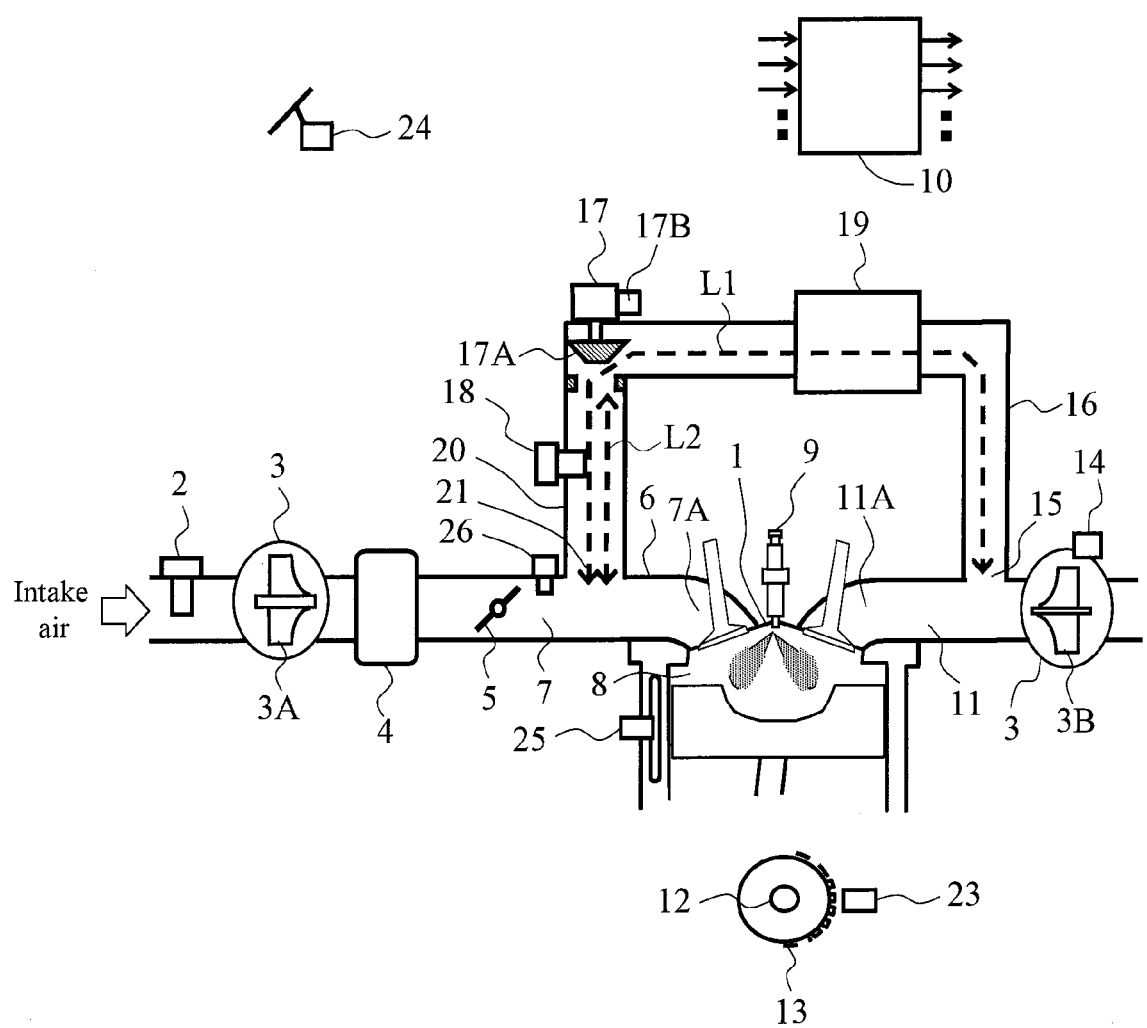
FIG. 1 is an overall configuration diagram of an engine control system equipped with a control apparatus including an EGR flow rate control apparatus of an internal combustion engine according to the embodiments.

FIG. 1 is an overall configuration diagram of an engine control system comprising a control apparatus that includes an EGR flow rate control apparatus of an internal combustion engine according to the present embodiment. As shown in FIG. 1, a diesel engine 1 (hereunder, referred to as engine (internal combustion engine) 1) includes a turbocharger 3. Intake air is captured by an air cleaner (unshown) and supercharged by a compressor 3A of the turbocharger 3. In this case, the intake air amount is measured by an intake air amount sensor 2 disposed upstream of the turbocharger 3.

An intercooler 4 is provided downstream of the turbocharger 3. Intake air that has been supercharged by the turbocharger 3 is cooled by the intercooler 4. An intake manifold 6 is provided downstream of the intercooler 4 via a throttle valve 5. Intake air distributed by the intake manifold 6 is distributed to individual cylinders.

The distributed intake air is taken into the inside of the combustion chamber 8 through an intake valve via an intake pipe 7. At this time, the intake air amount that is taken into the combustion chamber 8 is controlled by the throttle valve 5 based on a control signal from a control apparatus 10. Where required, an intake pipe pressure sensor 26 may be provided in the intake pipe 7 at a location downstream of the throttle valve 5.

A fuel injection valve 9 that injects fuel into the combustion chamber 8 is installed in the engine 1. Fuel injected into the combustion chamber 8 by the fuel injection valve 9 mixes with the intake air to generate an air-fuel mixture and burns inside the combustion chamber 8.

The burned gas (exhaust gas) that has burned in the combustion chamber 8 is discharged to an exhaust pipe 11 via a discharge port 11A, and drives a turbine 3B of turbocharger 3. In this case, a VGT (Variable Geometry Turbocharger) actuator (VGT valve) 14 for intake pressure control is mounted in the supercharged engine that can variably control an intake pressure. The VGT actuator 14 is controlled by a control signal in accordance with a VGT control amount output from the control apparatus 10. As a result, the intake pressure (supercharging pressure) of the intake pipe 6 can be controlled.

The engine 1 according to the present embodiment further includes EGR pipes (EGR flow channel) 16 and 20 on an intake side and an output side that communicate the exhaust pipe 11 with the intake pipe 7, an EGR control valve (gas flow rate regulating valve) 17 installed in the EGR flow channel, and an EGR flow sensor (gas flow rate measurement apparatus) 18 installed on an intake pipe 7 side with respect to the gas flow rate regulating valve (hereunder, referred to as "EGR valve") 17.

More specifically, an EGR intake port 15 is formed partway along the exhaust pipe 11 from the discharge port 11A to the turbine 3B. The engine is configured such that a part (EGR gas) of the exhaust gas flowing through the exhaust pipe 11 is taken in from the EGR intake port 15, and flows in sequence through a EGR cooler 19 and the EGR control valve (EGR valve) 17 that has a lift valve mechanism via an intake-side EGR pipe 16. The EGR gas that passes through the EGR valve 17 flows through an output side EGR pipe 20 and is recirculated in the intake manifold 6 as the intake side via an EGR output port 21.

In this case, with respect to the EGR gas flow rate, the degree of valve opening (lift amount of valve element 17A) is regulated by the EGR valve 17 based on a control signal from the control apparatus 10. The EGR valve 17 is also provided with a lift sensor 17B that measures the degree of valve opening. An EGR flow sensor 18 is installed on a downstream side (intake side) of the EGR valve 17 in the output side EGR pipe 20. The EGR gas flow rate that has been regulated by the EGR valve 17 can be measured by the EGR flow sensor 18.

Further, the engine 1 includes a water temperature sensor 25 that measures the temperature of circulating water that cools the engine. To measure the number of revolutions of the internal combustion engine and a crank angle position, a crank shaft 12 is provided with a crank angle plate 13 and a crank angle sensor 23 that measures the rotational position of the crank angle plate. The engine 1 also includes an accelerator sensor 24 that measures an accelerator operation amount of the driver. The control apparatus 10 of the internal combustion engine captures signals of each sensor, calculates a control amount, and outputs a control signal to each actuator.

Figure 2:
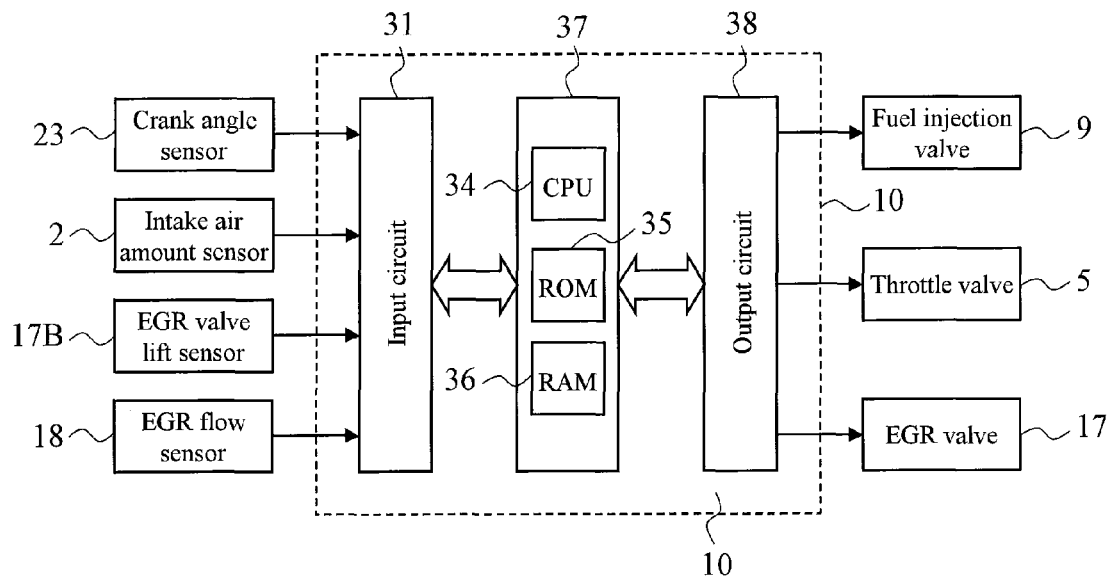
FIG. 2 is a schematic configuration diagram of the EGR flow rate control apparatus of an internal combustion engine shown in FIG. 1.

FIG. 2 is a schematic configuration diagram of the EGR flow rate control apparatus of the internal combustion engine shown in FIG. 1. The engine control apparatus (control apparatus of internal combustion engine) 10 is an electronically controlled apparatus. According to the present embodiment, of the entire functions of the engine control apparatus 10, a portion of the apparatus that has functions relating to control of the EGR gas flow rate is described in particular.

As shown in FIG. 2, the control apparatus 10 (EGR flow rate control apparatus of the internal combustion engine) of the engine includes an input circuit 31 into which signals of various sensors are input, a microcomputer unit 37 that calculates control amounts of various kinds of actuators based on input signals, and an output circuit 38 that outputs control signals to various actuators based on control amounts.

More specifically, sensor signals measured with various sensors such as an airflow sensor 2, the crank angle sensor 23, an accelerator sensor 24, the EGR valve lift sensor 17B, and the EGR flow sensor 18 are input to the microcomputer unit 37 via the input circuit 31.

The microcomputer unit 37 includes a CPU 34, a ROM 35, and a RAM 36. Based on data from the ROM 35 and RAM 36 and the values of input sensor signals, the microcomputer unit 37 calculates control amounts of various actuators including the fuel injection valve 9, the throttle valve 5, and the EGR valve 17. The calculated control amounts are converted into control signals via the output circuit 38, and the control signals are output to various actuators such as the fuel injection valve 9, the throttle valve 5, and the EGR valve 17. Thus, the various actuators are controlled by the engine control apparatus 10.

Before describing the detailed configuration of the engine control apparatus (EGR control apparatus of the internal combustion engine) 10 according to the present embodiment, the studies performed by the inventors regarding pulsatory motion of an EGR gas flow rate and novel findings obtained from those studies are described hereunder referring to FIGS. 3 to 7.

According to results obtained by the inventors after conducting concentrated studies, it was confirmed that the influence of fluctuations in exhaust pressure are strongly received inside the EGR passage on the exhaust pipe 11 side with respect to the EGR valve 17, and the amplitude of pulsations in the EGR gas flow rate is greater in the EGR passage on the exhaust pipe 11 side than in the EGR passage on the intake pipe side with respect to the EGR valve 17. It was thus found that there is an increase in measurement errors of the EGR flow sensor 18 when the EGR flow sensor 18 is disposed on the exhaust pipe side with respect to the EGR valve 17 in comparison to when the EGR flow sensor 18 is disposed on the intake pipe side.

This is because the influence of exhaust pressure fluctuations is alleviated by the flow channel resistance of EGR gas flowing in the EGR valve element part 17A inside the EGR passage 20 on the intake pipe 7 side with respect to the EGR valve 17, and thus the amplitude of pulsations in the EGR gas flow rate (EGR gas) is smaller than that of the pulsations on the exhaust pipe side. Thus, the inventors obtained the novel finding that disposing the EGR flow sensor 18 on the intake pipe 7 side with respect to the EGR valve 17 is an effective method of reducing flow rate measurement errors of the EGR flow sensor 18.

Based on this novel finding, the inventors conducted repeated experiments and found that when the EGR flow sensor 18 is disposed on the intake pipe 7 with respect to the EGR valve 17, the error characteristics described hereunder occur in the EGR flow sensor 18. The error characteristics of the EGR flow sensor 18 are described below referring to FIG. 3.

Figure 3:
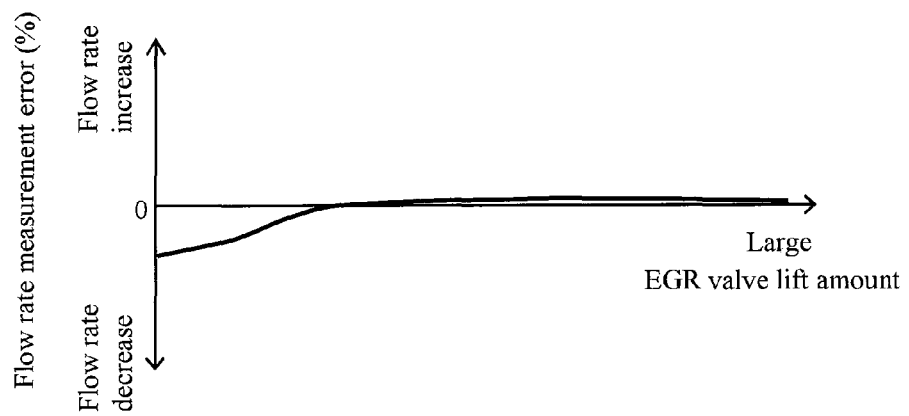
FIG. 3 is a view that illustrates a measurement example of the relationship between the lift amount of an EGR valve and the measurement error of an EGR flow sensor when the number of revolutions of an internal combustion engine is constant.

FIG. 3 is a view that illustrates a measurement example of the relationship between lift amounts of the EGR valve 17 and measurement errors of the EGR flow sensor 18 when the number of revolutions of the internal combustion engine (number of engine revolutions) is constant. In this case, a measurement error is determined by (relative ratio between measured flow rate and actual flow rate−1)×100%.

As shown in FIG. 3, the measurement results showed that flow rate measurement errors change according to the lift amount of the EGR valve 17. If the flow rate measurement errors are constant, it is possible to reduce measurement errors by correcting the measured values with a constant correction amount. However, since the degree of opening (lift amount) of the EGR valve 17 fluctuates according to changes in the operating state, even if such correction is performed the measurement errors will occur as before when the lift amount of the EGR valve 17 changes. The measurement error leads to an error in controlling the EGR gas flow rate, and thus discharge amounts of PM or NOx increase. Thus, the experiments of the inventors showed that a problem exists regarding decreasing measurement errors of an EGR flow sensor that are caused by changes in the lift amount of the EGR valve 17.

Figure 4:
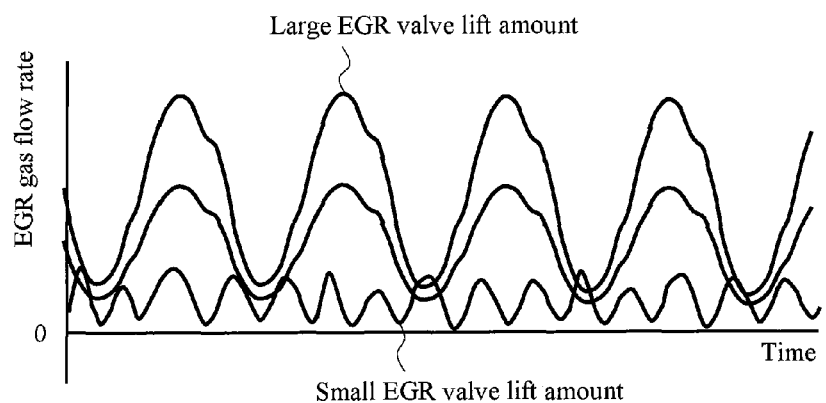
FIG. 4 is a view that illustrates the relationship between an EGR gas flow rate and the lift amount of an EGR valve under a condition in which the number of revolutions of an internal combustion engine is constant.

Therefore, using a test engine, the inventors conducted further studies regarding the reason why measurement errors of the EGR flow sensor 18 increase depending on the lift amount of the EGR valve 17. FIG. 4 is a view that illustrates the relationship between the EGR gas flow rate and lift amounts of the EGR valve under a condition in which the number of revolutions of the internal combustion engine (number of engine revolutions) is constant.

As shown in FIG. 4, when changes in the EGR gas flow rate at respective lift amounts of the EGR valve 17 were measured under a condition in which the number of engine revolutions is constant, it was observed that, on the intake side position (sensor measurement position) of the EGR valve 17, as shown in FIG. 4, when the lift amount of the EGR valve 17 is small, the pulse frequency of the EGR gas flow rate increases compared to when the lift amount is large. More specifically, it was found that the pulse frequency of the EGR gas flow rate varies significantly according to a change in the lift amount of the EGR valve 17.

EGR gas (EGR gas flow rate) that passes through the EGR passage is excited by exhaust pipe pressure fluctuations and intake pipe pressure fluctuations from both ends of the passage. In this case, a phase difference occurs between the exhaust pipe pressure fluctuations and the intake pipe pressure fluctuations, and high frequency pulsations are liable to occur inside the EGR passage due to interference of these pressure fluctuations.

According to the studies of the inventors, the flow channel resistance of a diaphragm portion of the EGR valve 17 increases as a lift amount of the EGR valve 17 decreases. It was thereby found that the diaphragm portion of the EGR valve 17 becomes a node of columnar resonance vibrations of the EGR pipe, and since the effective length (air-column length) of the EGR passage in which the EGR flow sensor 18 is disposed becomes shorter, the pulse frequency changes significantly to the high frequency side even more.

This is considered to be due to the following reasons. That is, referring again to FIG. 1, the passage length of the EGR passage is a passage length L1 from the EGR intake port 15 for EGR gas to the EGR output port 21 when the lift amount of the EGR valve 17 is large. However, when the EGR valve lift amount is small, the flow channel resistance of the EGR valve element part 17A increases. As a result, the effective length of the passage in which the EGR flow sensor 18 is disposed is a distance L2 from the EGR valve element part 17A to the EGR output port 21, which is shorter in comparison to the effective length of the passage when the lift amount of the EGR valve 17 is large. As a result, the resonance frequency of the EGR passage changes to a high frequency.

Further, when the lift amount of the EGR valve 17 is small, there is the characteristic that pressure fluctuations increase in the passage downstream of the EGR valve (diaphragm portion) and the high frequency pressure fluctuations are difficult to attenuate. It is considered that when the passage resonance frequency shifts to the high frequency side as the result of a change in the lift amount of the EGR valve 17 due to these factors, high frequency resonance (pulsations) occurs.

On the other hand, in the intake passage (throttle valve upstream), since one end of the passage is open to the atmosphere it is difficult for high frequency pressure fluctuations to occur, and even if the degree of throttle valve opening changes, there is almost no occurrence of changes in the pulse frequency to the high frequency region.

Because of these reasons, it is considered that the fact that the pulse frequency of EGR gas changes over a wide frequency range depending on the lift amount (degree of opening of diaphragm valve) of the EGR valve 17 is a characteristic phenomenon that occurs in the EGR passage on the intake pipe 7 side with respect to the EGR valve 17.

Next, based on the above described phenomenon, the inventors performed further studies regarding the influence on flow rate measurement values of an EGR flow sensor when the pulse frequency of an EGR gas flow rate changes. These studies and the results thereof are described hereunder referring to FIG. 5.

Figure 5:
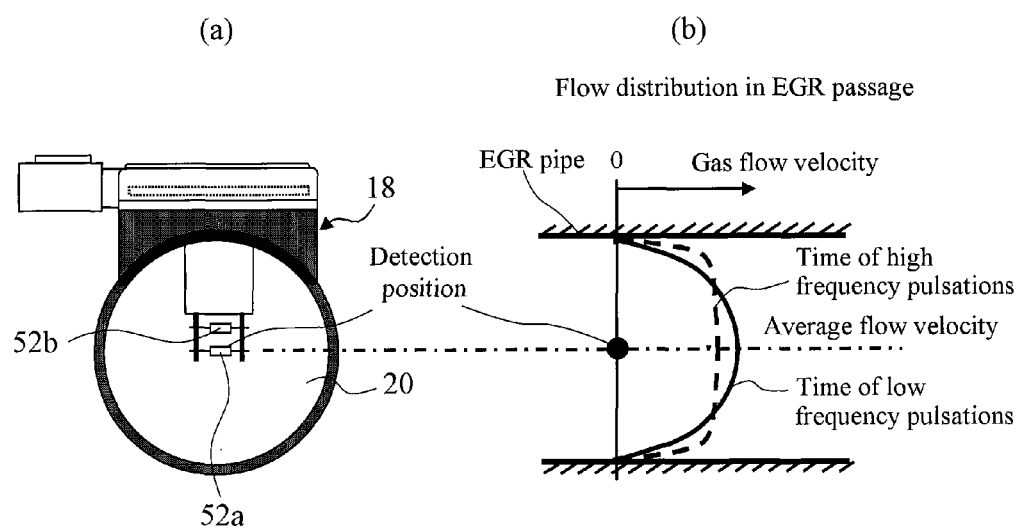
FIG. 5 includes views illustrating the relationship between a measurement position of an EGR flow sensor and a flow velocity distribution inside an EGR passage, in which (a) is a configuration diagram of the EGR flow sensor, and (b) is a view that illustrates a measurement result regarding a flow velocity distribution of gas at a cross-section of an EGR passage when pulsation of EGR gas is occurring.

FIG. 5 includes a view that illustrates the relation between a measurement position of the EGR flow sensor 18 and a view that shows the flow velocity distribution inside the EGR passage. FIG. 5(a) is an example of a configuration diagram of the EGR flow sensor 18. The EGR flow sensor 18 measures a gas flow rate based on the heat discharge amount of a heating resistor 52a disposed inside an EGR passage 20. A resistance temperature sensor 52b is a resistance element for correcting the influence of the gas temperature.

Since the gas flow rate differs according to the cross-sectional position in the EGR passage 20, the EGR flow sensor 18 measures the gas flow rate at the position (measurement position) of the heating resistor 52a. This is done so that the EGR flow sensor 18 measures the EGR gas flow rate when a constant relationship exists between the gas flow rate flowing through the EGR passage overall and the gas flow rate at the measurement position.

FIG. 5(b) is a view that illustrates measurement results regarding the flow velocity distribution of gas at a cross section of the EGR passage when EGR gas pulsations are occurring. To take into account the EGR gas pulsations, the flow velocity distribution at the EGR passage cross section is a time average of the flow velocity at each position.

The solid line in FIG. 5(b) indicates the flow velocity distribution when the pulse frequency of EGR gas (EGR gas flow rate) is a low frequency. The broken line indicates the flow velocity distribution when the pulse frequency of EGR gas (EGR gas flow rate) is a high frequency. Here, the case in which the pulse frequency is a low frequency and the case in which the pulse frequency is a high frequency indicate the flow velocity distribution of the EGR gas when the flow rate of EGR gas flowing through the entire EGR passage has been equalized.

The measurement results in FIG. 5(b) show that when the pulse frequency of EGR gas (EGR gas flow rate) is a high frequency, the mean flow velocity at the measurement position decreases compared to the case of a low frequency. More specifically, according to the studies of the inventors, it was newly found that the relation between the gas flow rate flowing through the EGR passage overall and the mean gas flow rate at the measurement position is not constant, but instead changes according to the pulse frequency of EGR gas, and this is a cause of errors of the EGR flow sensor 18.

Figure 6:
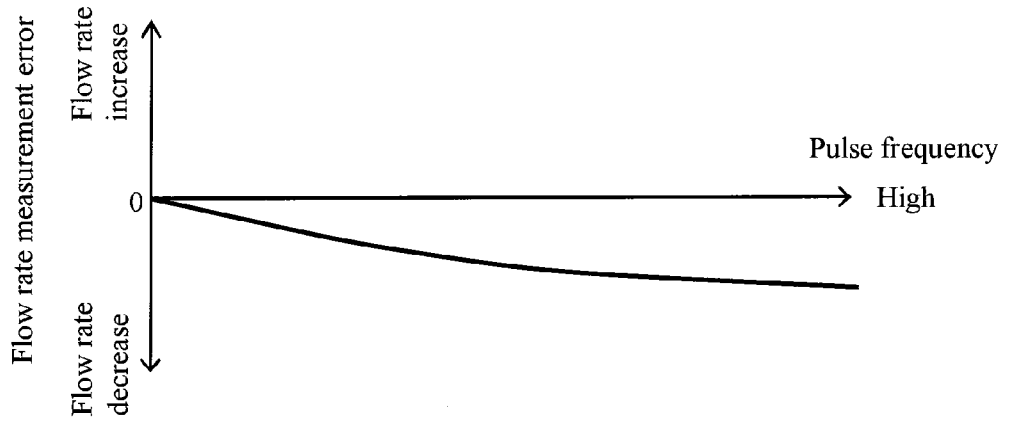
FIG. 6 is a view that illustrates an example of a measurement result for a pulse frequency of EGR gas and a flow rate measurement error of the EGR flow sensor.

FIG. 6 is a view that illustrates an example of measurement results with respect to pulse frequencies of the EGR gas (EGR gas flow rate) and flow rate measurement errors of the EGR flow sensor 18. The measurement errors of the EGR flow sensor 18 show the error characteristics of sensor measurement values with respect to the actual flow rate of the EGR passage overall. The error characteristics are characteristics in cases in which the actual flow rate of the entire EGR passage and the pulse amplitude are the same, and only the pulse frequency changes. Further, the relative value of errors is shown when the measurement error in a state in which there are no pulsations is taken as 0. Based on the measurement results shown in FIG. 6, it is found that in accordance with a rise in the pulse frequency, errors increase in the direction in which the flow rate decreases.

Thus, according to the studies of the inventors with regard to measurement errors of the EGR flow sensor when an EGR valve lift amount (degree of valve opening) changes as described above, it was found that the pulse frequency of EGR gas changes due to changes in the EGR valve lift amount, and as a result the flow velocity distribution in the EGR passage is changed.

Further, in addition to the lift amount of the EGR valve 17, since the pulse frequency of the exhaust pressure and intake pressure is also changed according to the number of engine revolutions, the pulse frequency of the EGR gas flow rate also changes according to the number of engine revolutions.

Figure 7:
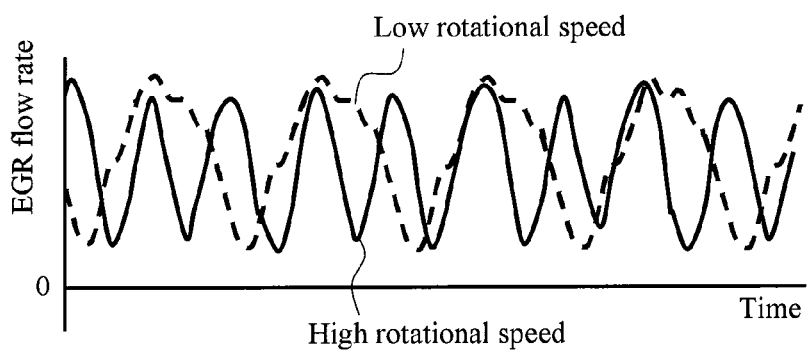
FIG. 7 is a view that illustrates changes in pulsations of an EGR gas flow rate with respect to when an engine rotates at a high speed and when the engine rotates at a low speed.

FIG. 7 is a view that illustrates changes in pulsations of an EGR gas flow rate with respect to when an engine rotates at a high speed and when the engine rotates at a low speed. As shown in FIG. 7, the pulse frequency of the EGR gas flow rate is higher when the engine rotates at a high speed compared to when the engine rotates at a low speed. Consequently, when the number of engine revolutions changes, similarly to when the lift amount of the EGR valve changes, the pulse frequency of the EGR gas flow rate changes. The flow velocity distribution of the EGR passage changes accompanying changes in the pulse frequency, and this change in the flow velocity distribution is a cause of measurement errors of the EGR flow sensor 18.

As described above, since the pulse frequency is liable to become a high frequency inside the EGR passage on the intake side with respect to the EGR valve 17, the pulse frequency is shifted further to the high frequency side by a rise in the number of engine revolutions. It is thought that in such case, errors of the EGR flow sensor increase due to fluctuations in the pulse frequency.

The foregoing describes the novel findings of the inventors. Based on these findings, an example of the configuration of an EGR flow rate control apparatus according to the present embodiment for reducing measurement errors in the above described EGR flow sensor is described below.

Figure 8:
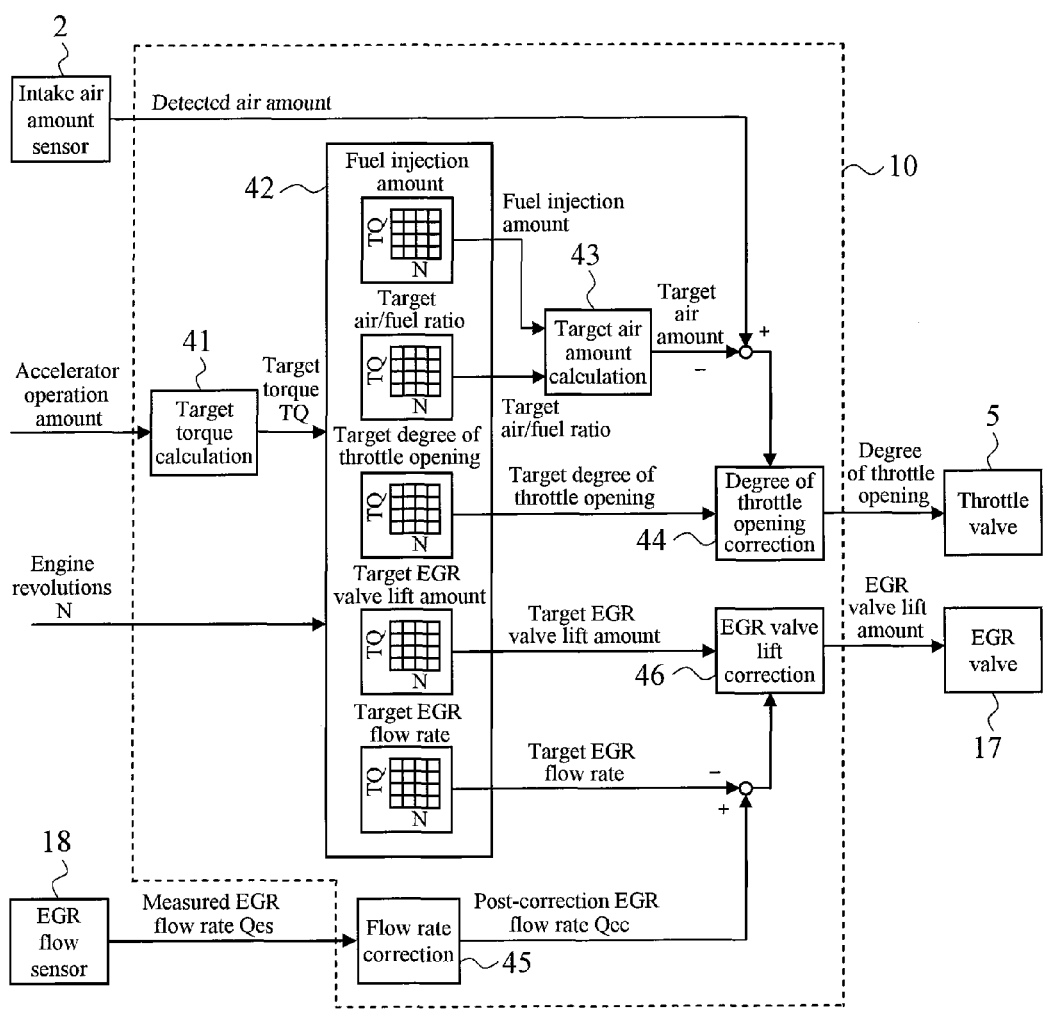
FIG. 8 is a control block diagram of a section relating to EGR flow rate control in the engine control apparatus according to the first embodiment.

FIG. 8 is a control block diagram of a section relating to EGR flow rate control in the engine control apparatus 10 according to the present embodiment. As shown in FIG. 8, the control apparatus (EGR flow rate control apparatus) 10 of an internal combustion engine of the present embodiment includes at least target torque calculation means 41, target operating state calculation means 42, target air amount calculation means 43, degree of throttle opening correction means 44, EGR flow rate correction means (gas flow rate correction means) 45, and EGR valve lift correction means 46.

The target torque calculation means 41 measures the accelerator operation amount (depression amount) when the driver depresses the accelerator pedal, and calculates a target torque (demand torque) that the driver demands for the vehicle in accordance with the accelerator operation amount.

The target operating state calculation means 42 calculates a control amount related to the target operating state based on the calculated target torque and the number of engine revolutions counted by the crank angle sensor 23. More specifically, the target operating state calculation means 42 calculates, for each target torque and each number of engine revolutions, a fuel injection amount, a target air/fuel ratio, a target degree of throttle opening, a target EGR valve lift amount, a target EGR flow rate (target EGR gas flow rate) and the like required to realize the target torque demanded by the driver and also to achieve an intake air amount and EGR rate that reduce the discharge amounts of exhaust gases (NOx and PM). Control parameters such as the fuel injection amount, target air/fuel ratio, target degree of throttle opening, target EGR valve lift amount, and target EGR flow rate are previously stored in a map-like memory defined by target torque TQ and number of engine revolutions N. The relevant control parameter can be determined by extracting the control parameter corresponding to the target torque TQ and number of engine revolutions N from the memory.

Next, the target air amount calculation means 43 calculates the target air amount based on the target air/fuel ratio and the fuel injection amount calculated by the target operating state calculation means 42. Further, the degree of throttle opening correction means 44 corrects the target degree of throttle opening calculated by the target operating state calculation means 42 so that the value of a detection air quantity measured by the intake air amount sensor 2 becomes the target air amount value, and controls the degree of opening of the throttle valve 5 by outputting the corrected degree of throttle opening as a control signal to the throttle valve 5.

The lift amount of the EGR valve 17 is controlled so that the measurement EGR gas flow rate (measurement flow rate) that is measured by the EGR flow sensor 18 becomes the target EGR gas flow rate. More specifically, according to the present embodiment, as described later, flow rate correction means 45 is provided that corrects a measurement EGR flow rate that is measured by the EGR flow sensor 18.

Subsequently, the EGR valve lift correction means 46 compares the target EGR flow rate (target EGR gas flow rate) calculated by the target operating state calculation means 42 and the corrected EGR gas flow rate (post-correction EGR gas flow rate) Qec, corrects the target EGR valve lift amount in accordance with the difference determined by the comparison, and outputs the corrected EGR valve lift amount as a control signal to the EGR valve 17 to control the EGR valve 17.

Although according to the present embodiment, the target EGR gas flow rate is read out from a map-like memory, a configuration may also be adopted in which target EGR rates are stored in advance in the aforementioned memory and the target EGR gas flow rate is calculated based on the detection air quantity and the target EGR rate.

Figure 9:
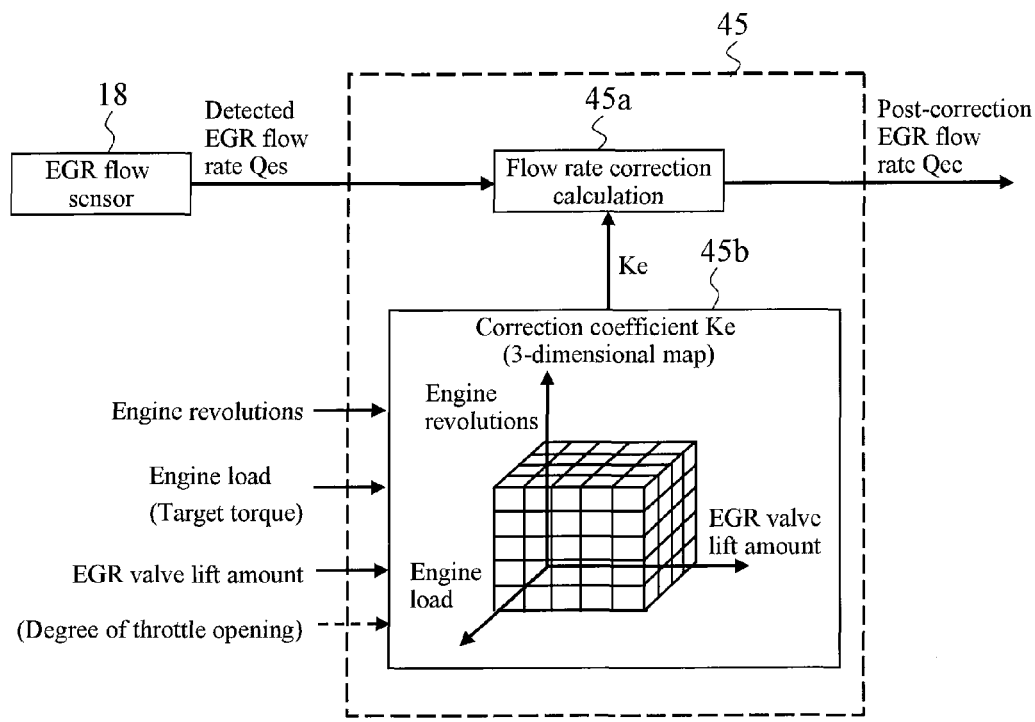
FIG. 9 is a block diagram of EGR flow rate correction means according to the first embodiment shown in FIG. 8.

Next, the EGR flow rate correction means 45 that is a feature of the EGR gas flow rate control of the present embodiment is described in detail referring to FIG. 9. FIG. 9 is a block diagram of the EGR flow rate correction means 45 shown in FIG. 8.

As shown in FIG. 9, the EGR flow rate correction means 45 includes flow rate correction calculation means 45a and flow rate correction coefficient calculation means 45b. The EGR flow rate correction means 45 captures a measurement signal of the EGR flow sensor 18, and corrects a measured flow rate (compensates for a measurement error) of the EGR flow sensor 18 in accordance with changes in the pulse frequency of EGR gas accompanying changes in the lift amount of the aforementioned EGR valve 17. More specifically, a measured flow rate obtained from a measurement signal of the EGR flow sensor 18 is used to calculate a post-correction EGR gas flow rate (flow rate correction value) Qec in accordance with the operating state at the EGR flow rate correction means 45.

The flow rate correction value Qec is calculated using the following equation in which a measured flow rate of the EGR flow sensor 18 is represented by Qes and a correction coefficient is represented by Ke.

$$Qec = Qes \times Ke \qquad \text{[Equation 1]}$$

As described above, since the pulse frequency and pulse amplitude (fluctuation range of flow rate) of the EGR gas flow rate at the measurement position of the EGR flow sensor 18 fluctuate according to pressure fluctuations in the intake pipe or exhaust pipe at the two ends of the EGR passage and the flow channel resistance of the EGR passage (EGR valve), the measurement errors of the EGR flow sensor also fluctuate due to these causes.

Consequently, in the EGR control apparatus of the present invention, the measured flow rate of the EGR flow sensor 18 is corrected using a first operating state parameter that relates to pressure fluctuations in the intake pipe or exhaust pipe and a second operating state parameter that relates to the flow channel resistance of the EGR passage.

Although the number of engine revolutions (number of revolutions of the internal combustion engine) and the engine load (load of the internal combustion engine) are used as examples of the first operating state parameter that relates to pressure fluctuations in the intake pipe or exhaust pipe, in addition at least one member of the group comprising the target torque, fuel injection amount, intake pipe pressure, degree of throttle valve opening, exhaust pipe pressure, VGT control amount, and the like may also be mentioned as examples of the first operating state parameter.

Although the lift amount (degree of opening) of the EGR valve is used as a second operating state parameter that relates to the flow channel resistance of the EGR passage, in a case where, in addition to the measured EGR gas flow rate, the basic lift amount of the EGR valve is set with respect to a parameter such as the number of engine revolutions, engine load, fuel injection amount, and target torque, these parameters may also be considered to be operating state parameters relating to the flow channel resistance. Therefore, the flow rate correction coefficient calculation means 45b outputs a correction coefficient in accordance with these input parameters.

According to the present embodiment, the number of engine revolutions and the engine load are input as first operating state parameters relating to pressure fluctuations in the intake pipe or exhaust pipe, and the EGR valve lift amount is input as a second operating state parameter relating to flow channel resistance of the EGR passage, and correction coefficient data that has been stored with respect to this combination of input parameters is referred to and output.

The method of setting the correction coefficient data is as follows. Correction coefficients that make errors of the EGR flow sensor equal to zero in each operational state that is decided according to the combination of input parameters are previously determined by engine tests and the like. The correction coefficients corresponding to each combination of input parameters are stored in advance in a map-like memory.

Figure 10:
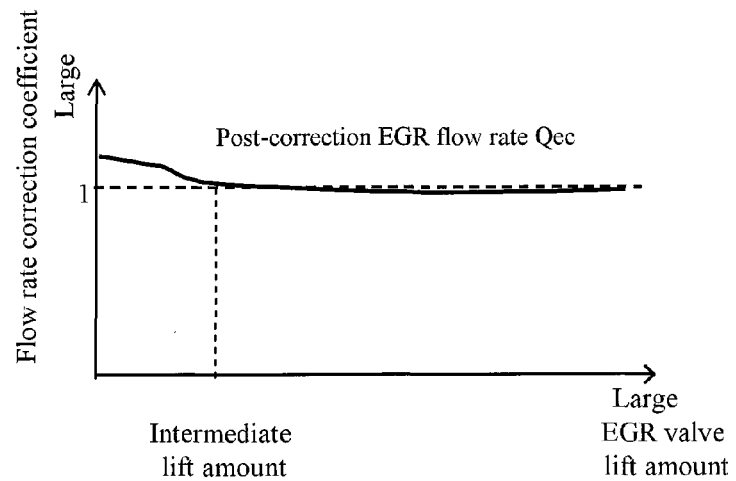
FIG. 10 is a view that illustrates an example of correction characteristics when an EGR valve lift amount changes at an operating point of a certain number of engine revolutions and a certain engine load.

FIG. 10 is a view that illustrates an example of correction characteristics when an EGR valve lift amount changes at an operating point of a certain number of engine revolutions and engine load. As an example, when the EGR valve lift amount is less than an intermediate lift amount (predetermined degree of valve opening), the pulse frequency of EGR gas increases and, as described above, the flow velocity distribution changes in a direction in which the flow velocity decreases. Hence, in comparison to an intermediate lift amount (predetermined degree of opening), when the lift amount is less than the intermediate lift amount the flow rate correction coefficient increases as the lift amount decreases, and the measured EGR gas flow rate Qes (correction on the flow rate increase side) is obtained.

When the structure in this case is such that the EGR flow sensor can not determine a back flow, a case may arise in which an error occurs in the direction in which the flow velocity increases due to the influence of a back flow produced by pulsations when the EGR valve lift amount is such that the EGR valve is almost fully closed. In such case, a configuration may be adopted such that the flow rate correction coefficient is corrected to the decreasing side with an EGR valve lift amount with which errors in the direction in which the flow rate increases occur due to a back flow.

In this case, at the EGR control apparatus at which the basic lift amount of the EGR valve is set with respect to the number of engine revolutions and engine load, a combination of the parameters for the number of engine revolutions and the engine load can also be substituted for the lift amount of the EGR valve. Regarding the parameters for performing flow rate correction in this case, the second operating state parameters that relate to the lift amount of the EGR valve (flow channel resistance of passage) are the number of engine revolutions and the engine load, and the first operating state parameters that relate to intake pressure fluctuations and exhaust pressure fluctuations are also the number of engine revolutions and the engine load. Since the number of engine revolutions and the engine load are parameters common to both the first and second operating state parameters, the flow rate correction coefficient may be set with respect to these two parameters consisting of the number of engine revolutions and the engine load.

Figure 11:
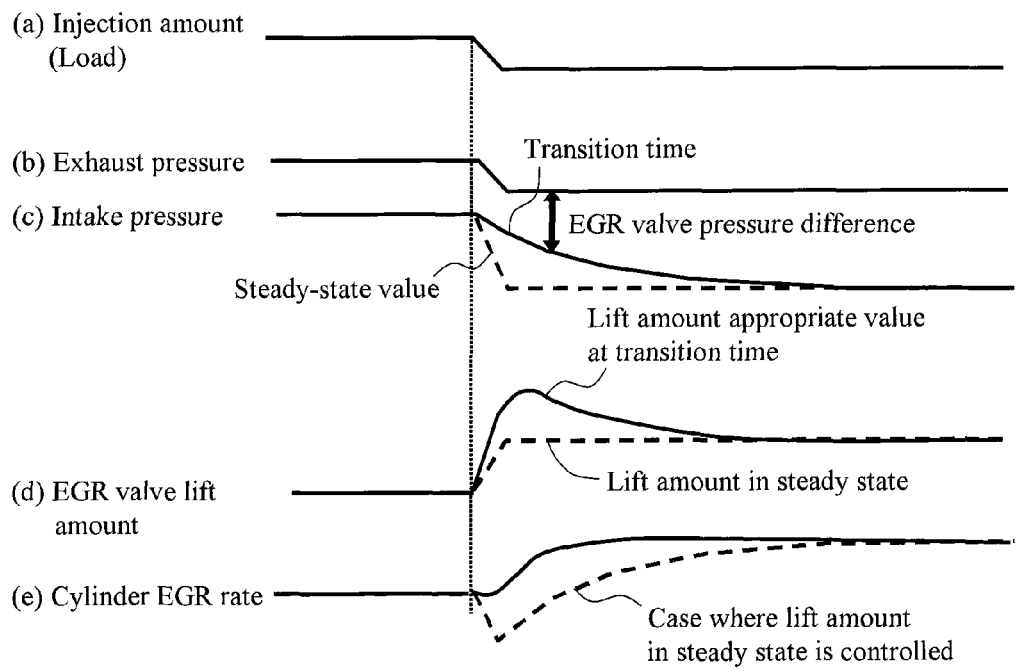
FIG. 11 is a view that illustrates the behavior of an EGR valve lift amount at a time of an engine load change (transition time).

A method that calculates a flow rate correction coefficient using the number of engine revolutions and the engine load as first operating state parameters and using an EGR valve lift amount as a second operating state parameter as in the present embodiment offers the advantages described below. FIG. 11 is a view that illustrates the behavior of an EGR valve lift amount at a time of an engine load change (transition time). As an example, when the engine load decreases as shown in (a), while the exhaust pressure changes in accordance with the engine load as shown in (b), changes in the intake pressure are delayed with respect to changes in the engine load as shown in (c) due to a response delay and the like of the turbocharger 3. As a result, at such a transition time when the engine load decreases, a pressure difference at the EGR valve (difference between exhaust pressure and intake pressure) decreases compared to when in a steady state. Consequently, when the EGR valve lift amount in a steady state is set as shown by the dashed line in (d), the EGR gas flow rate (EGR rate) is insufficient and the NOx discharge amount increases as shown by the dashed line in (e).

An appropriate value of the EGR valve lift amount that suppresses fluctuations in the EGR rate with respect to pressure difference fluctuations in the EGR valve at the time of a transition is shown by the solid line in (d). When the pressure difference at the EGR valve at a transition time decreases, the EGR rate can be held at an appropriate value in a steady-state by temporarily increasing the EGR valve lift amount.

More specifically, the appropriate values of the EGR valve lift amount will differ between a steady state and a transition time even if the operating point for the number of revolutions and engine load are the same. Therefore, according to the present embodiment, EGR flow rate correction values are calculated with three parameters consisting of the number of engine revolutions, the engine load, and the EGR valve lift amount, to thereby improve the measurement accuracy of the EGR flow sensor at a transition time also.

In this case, the aforementioned fuel injection amount or target torque may be used instead of the engine load as an input parameter for calculating the flow rate correction coefficient.

Further, a measurement value of the intake pipe pressure obtained by the intake pipe pressure sensor 26 that is a parameter related to intake pressure fluctuations may be used as an input parameter for calculating the flow rate correction coefficient.

Figure 12:
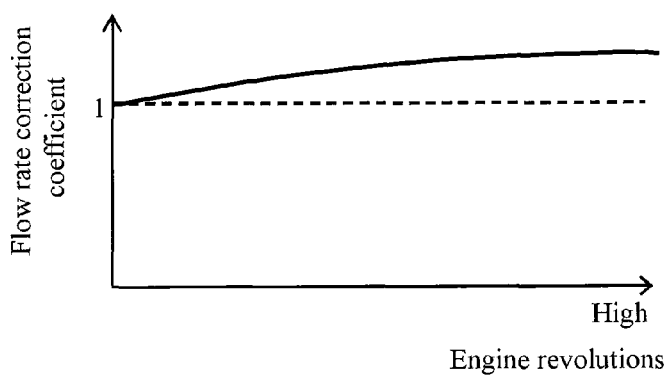
FIG. 12 is a view that illustrates changes in a flow rate correction coefficient according to the number of engine revolutions.

Changes in the pulse frequency of the EGR gas flow rate that are a cause of fluctuations in the flow velocity distribution inside the EGR passage also occur as the result of changes in the fluctuation frequency of the exhaust pressure and intake pressure accompanying changes in the number of engine revolutions, in addition to changes in the EGR valve lift amount. Hence, a configuration may be adopted in which the flow rate correction coefficient is changed by the number of engine revolutions as shown in FIG. 12. In this case, the pulse frequency of EGR gas increases at a time of a high rotational speed in comparison to a time of a low rotational speed, and the flow velocity distribution changes in a direction in which the flow velocity decreases. Therefore, the flow rate correction coefficient at a time of a high rotational speed is set to be larger (corrected to the flow rate increase side) in comparison with a flow rate correction coefficient at a time of a low rotational speed.

Further, depending on the engine in question, in some cases there are changes in the amount of fluctuations in the intake pressure at the EGR passage outlet due to in the degree of opening of the throttle valve 5, and as a result the pulse frequency in the EGR passage fluctuates. Hence, a configuration may also be adopted in which, in addition to the EGR valve lift amount, the degree of opening of the throttle valve is input as a parameter for correction.

Figure 13:
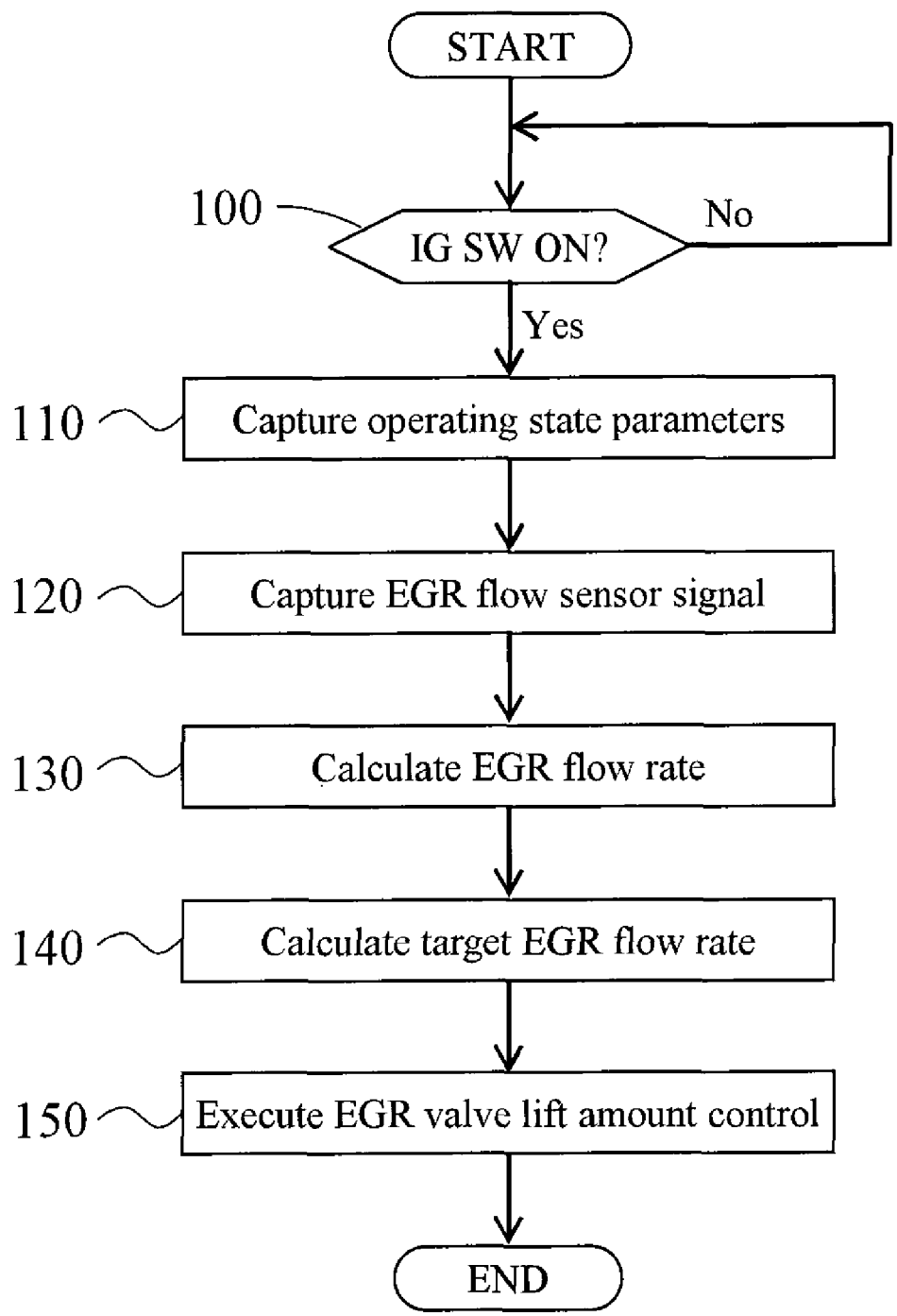
FIG. 13 is a flowchart illustrating operations of an EGR control apparatus according to the first embodiment.

FIG. 13 is a flowchart illustrating operations of the EGR control apparatus of the present embodiment. In step 100, the EGR control apparatus checks whether the ignition switch is turned on in order to determine whether or not the vehicle is operating. If the ignition switch is turned on, in step 110 the EGR control apparatus captures operating state parameters such as the number of engine revolutions, the engine load, and the EGR valve lift amount. In step 120, the EGR control apparatus captures a signal of the EGR flow sensor. In step 130, the EGR control apparatus calculates the EGR gas flow rate based on the signal of the EGR flow sensor. In step 140, based on the operating state parameters, the EGR control apparatus calculates a target EGR gas flow rate based on a map that is previously stored in correspondence with each operating state. In step 150, the EGR control apparatus adjusts the EGR valve lift amount so that the calculation value for the EGR gas flow rate obtained in step 130 becomes the target EGR gas flow rate.

Figure 14:
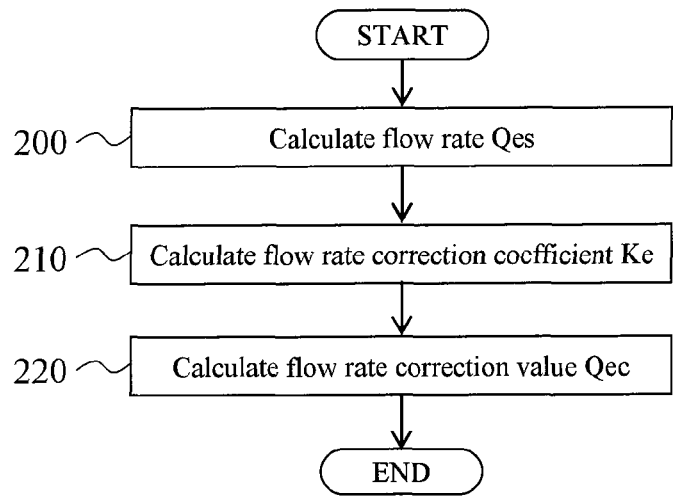
FIG. 14 is a flowchart illustrating a method of calculating an EGR gas flow rate in step 130 shown in FIG. 13.

The method of calculating the EGR gas flow rate in step 130 will now be described referring to FIG. 14. Since a signal of the EGR flow sensor is generally captured using a voltage level, in step 200 the signal of the EGR flow sensor is converted to a flow rate and taken as a measured value of the EGR gas flow rate Qes. In step 210, a correction coefficient Ke of the EGR gas flow rate is calculated. As described in FIG. 9, with respect to the correction coefficient of the EGR gas flow rate, the correction coefficient of the corresponding operating state is read out from the correction coefficient map for the EGR gas flow rate that is previously stored for each operating state, in accordance with operating state parameters such as the number of engine revolutions, the engine load, the EGR valve lift amount and the like that have been captured. As described previously, the correction coefficient Ke is set so as to reduce errors caused by changes in the EGR gas pulse frequency accompanying changes in the EGR valve lift amount and the number of engine revolutions.

In step 220, the flow rate correction value Qec is calculated by the above described Equation 1 taking the measured flow rate of the EGR flow sensor 18 as Qes and using the correction coefficient Ke.

According to the EGR flow rate control apparatus of the present invention as described above, it is possible to decrease measurement errors of an EGR flow sensor caused by changes in the pulse frequency of an EGR gas flow rate accompanying changes in an EGR valve lift amount. It is thereby possible to improve the control accuracy of the EGR gas flow rate and decrease discharge amounts of PM or NOx in exhaust gases.

Second Embodiment

According to the first embodiment, errors of an EGR flow sensor caused by fluctuations in the pulse frequency of EGR gas are corrected using first and second operating state parameters that represent the state of the engine. According to the second embodiment of the present invention, the EGR gas flow rate of an EGR flow sensor are corrected in accordance with the pulse frequency (or amount of change over time) of EGR gas (EGR gas flow rate) using changes over time in a measurement signal (measured EGR gas flow rate) of the EGR flow sensor. The configuration of an engine system including the EGR control apparatus of the present embodiment is the same as in the first embodiment.

Figure 15:
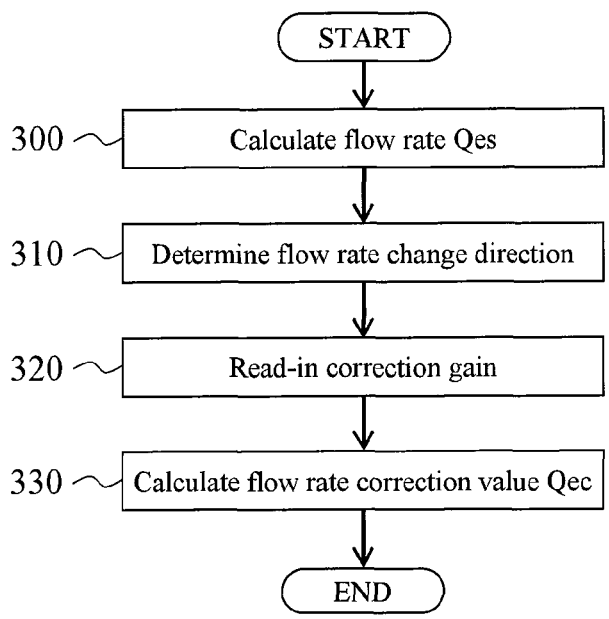
FIG. 15 is a flowchart illustrating a method of calculating an EGR gas flow rate according to a second embodiment.

The flow of operations of the EGR control apparatus of the present embodiment is the same as in the first embodiment (FIG. 7). A feature of the present embodiment is the method of calculating the EGR gas flow rate in step 130 in FIG. 7. The method of calculating the EGR gas flow rate according to the present embodiment will now be described using FIG. 15.

In step 300, a signal (voltage) of the EGR flow sensor is converted into an EGR gas flow rate, and taken as the measured EGR flow rate (EGR gas flow rate) Qes. In step 310, the direction of change in the EGR gas flow rate (increasing direction or decreasing direction) is determined. An example of a method of determining the direction of change in the EGR gas flow rate will now be described.

First, a low-pass filter value Qesf[n] of the EGR gas flow rate (measured EGR gas flow rate) Qes is determined by the following Equation 2. The filter calculation below is executed for each predetermined sampling period.

$$Qesf[n]=KHP\times(Qes[n]-Qesf[n-1])+Qesf[n-1] \quad \text{[Equation 2]}$$

where
Qes[n]: current measured flow rate
Qesf[n−1]: previous low-pass filter value
KHP: filter coefficient The direction of change in the EGR gas flow rate is determined to be the direction in which the flow rate rises when Qes[n]−Qesf[n]>0, and is determined to be the direction in which the flow rate falls when Qes[n]−Qesf[n]<0.

Next, in step 320, a correction gain previously stored in the memory is read out according to the flow rate change direction, and taken as a correction gain KH. When the direction of change is the direction in which the flow rate rises, KH is set to a predetermined value KHU. When the direction of change is the direction in which the flow rate falls, KH is set to a predetermined value KHD. When it is desired to make a correction in a direction in which the flow rate increases when an error of the EGR flow sensor is in a direction in which the flow rate decreases, KHU and KHD are set such that KHU>KHD. When it is desired to make a correction in a direction in which the flow rate decreases when an error of the EGR flow sensor is in a direction in which the flow rate increases, KHU and KM are set such that KHU<KHD.

In step 330, the flow rate correction value Qec is determined by the following equation or the like. KH×(Qes−Qesf) in Equation 3 below is a correction factor.

$$Qec=Qes+KH\times(Qes-Qesf) \quad \text{[Equation 3]}$$

Figure 16:
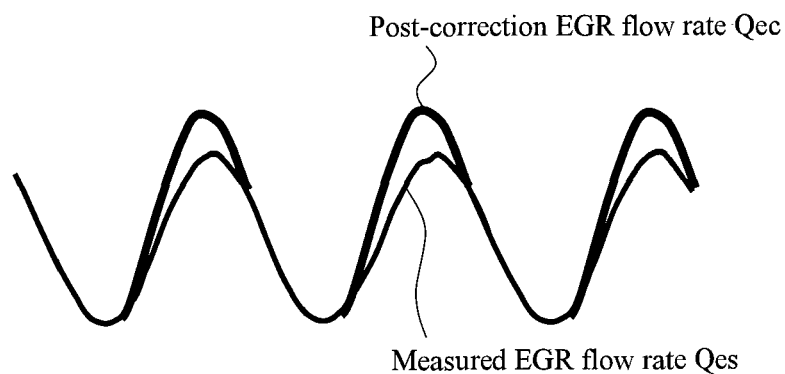
FIG. 16 is a view that illustrates a method of correcting an EGR gas flow rate according to the second embodiment.

According to the above equation, when an error of the EGR flow sensor is in a direction in which the flow rate decreases due to fluctuations in the flow velocity distribution in the EGR passage accompanying EGR gas pulsations, as shown in FIG. 16, the flow rate correction value Qec is corrected so that rising thereof becomes faster with respect to the measured flow rate Qes to thereby make a correction in the direction in which the flow rate increases. In contrast, when an error of the EGR flow sensor is in a direction in which the flow rate increases, the flow rate correction value Qec is corrected so that falling thereof becomes faster with respect to the measured flow rate Qes to thereby make a correction in the direction in which the flow rate decreases. More specifically, according to the present embodiment, the EGR flow rate correction means corrects the EGR gas flow rate based on the amount of a change over time in the EGR gas flow rate.

Figure 17:
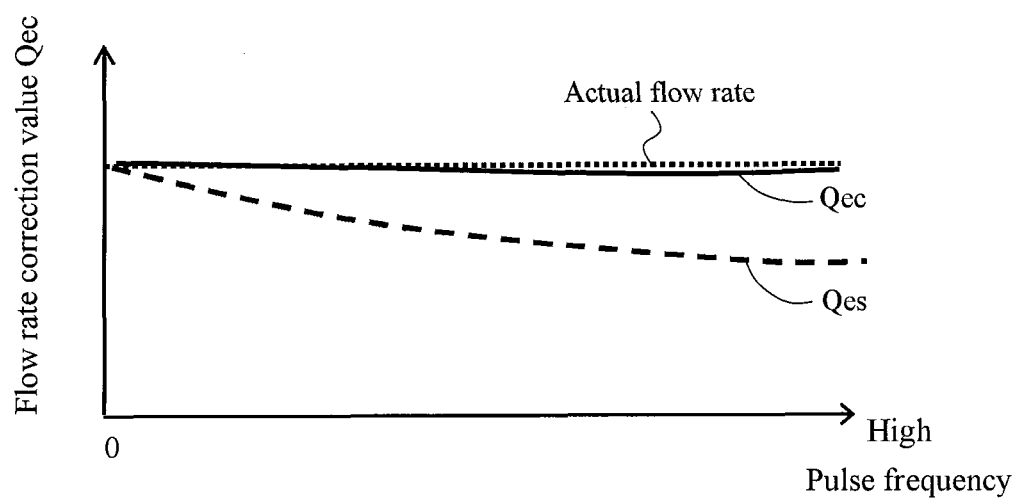
FIG. 17 is a view that illustrates correction characteristics with respect to the pulse frequency of EGR gas according to the second embodiment.

Correction characteristics when the pulse frequency of EGR gas changes are shown in FIG. 17. The dotted line represents the actual EGR gas flow rate. The dashed line represents an example of the measured flow rate Qes of the EGR flow sensor. An error in the direction in which the flow rate decreases due to a change in the flow velocity distribution in the passage increases in accordance with an increase in the pulse frequency. The solid line represents the flow rate correction value (post-correction EGR gas flow rate) Qec. Since the absolute value of Qes−Qesf of Equation 3 (corresponds to change amount during sampling period of Qes) increases as the pulse frequency of EGR gas increases, by increasing the correction amount with respect to Qes and setting the correction gain in conformity with the error characteristics, Qec is corrected so as to approximately match the actual flow rate. More specifically, according to the present correction method, it is possible to correct errors in accordance with a pulse frequency (amount of change over time) of the EGR gas flow rate, and thus the EGR gas flow rate can always be measured at a high accuracy even when the pulse frequency of the EGR gas fluctuates due to variations in the characteristics of components such as the EGR valve or variations in the shape of the cam of the engine and the like. It is thus possible to improve the control accuracy with respect to the EGR gas flow rate and reduce discharge amounts of PM and NOx in exhaust gases.

In this case, in addition to a method that uses a filter as a method of correcting a measured flow rate in accordance with a pulse frequency of EGR gas, a method may be adopted that measures a pulsation period of the EGR gas flow rate, calculates the pulse frequency, and corrects the measured EGR gas flow rate.

Further, in order to carefully and precisely correct errors with respect to changes in the pulse frequency of EGR gas or the operating state, the correction methods of the first embodiment and second embodiment may be combined.

Third Embodiment

Figure 18:
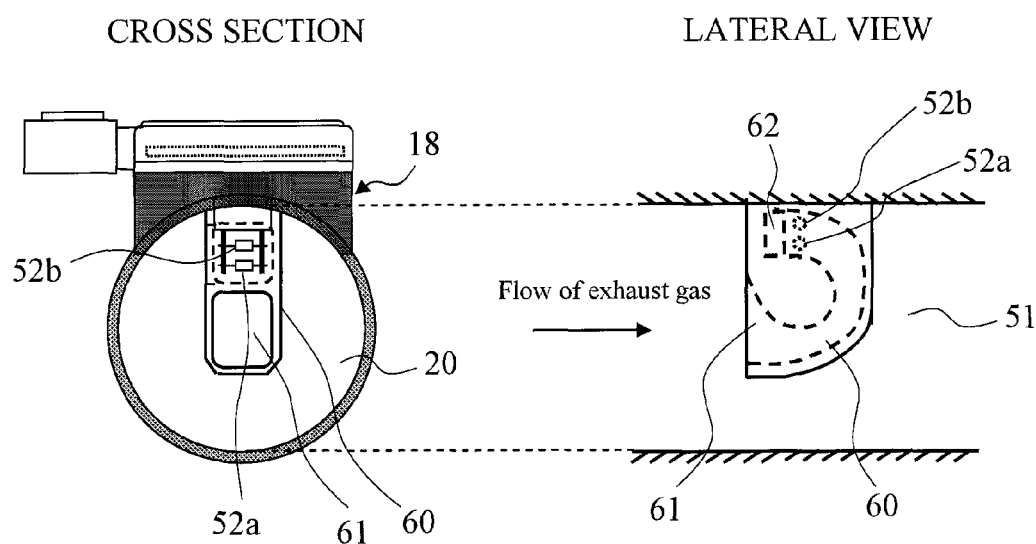
FIG. 18 is a configuration diagram of an EGR flow sensor according to a third embodiment.

FIG. 18 is a configuration diagram of an EGR flow sensor according to the third embodiment. Configurations for an EGR flow sensor include, in addition to a configuration in which a heating resistor is disposed inside an EGR passage as shown in FIG. 12, a configuration in which, as shown in FIG. 18, flow rate measurement errors caused by EGR gas pulsations are reduced by providing a bypass passage that suppresses gas pulsations inside an EGR passage for reducing flow rate measurement errors due to EGR gas pulsations, and disposing a heating resistor inside the bypass passage. According to this configuration, measurement error characteristics produced by an inertia effect of the bypass passage as described later change. The third embodiment of the present invention corrects the measured flow rate of an EGR flow sensor by taking into account the influence of flow velocity distribution changes caused by fluctuations in the EGR gas pulse frequency, and the influence of an inertia effect of the above described bypass passage.

A configuration example of an EGR flow sensor that has a bypass passage is illustrated in FIG. 18. The EGR flow sensor illustrated in FIG. 18 includes a bypass passage 60 provided in an EGR passage 20, and a heating resistor 52a and a resistance temperature sensor 52b provided inside the bypass passage 60.

The bypass passage 60 has an opening portion 61 facing in the EGR gas flow direction. The EGR gas flows into the bypass passage 60 from the opening portion 61, and flows out from an outlet portion 62 via the heating resistor 52a that measures the gas flow rate. Next, the relationship between the pulse frequency of the EGR gas and the flow velocity inside the bypass passage 60 is described. Due to a pressure loss inside the bypass passage 60 when EGR gas pulsations are occurring, changes in the gas flow velocity inside the bypass passage 60 are delayed with respect to changes in the gas flow velocity inside the EGR passage 20. This is generally referred to as an inertia effect of the bypass passage. The delay in flow velocity changes in the bypass passage caused by the inertia effect increases as the pulse frequency of the EGR gas increases, and therefore the maximum flow velocity decreases and a time-average value of the pressure loss that is a square function of the flow velocity decreases. Hence, the average gas flow velocity rises in comparison to when the pulse frequency is low.

Figure 19:
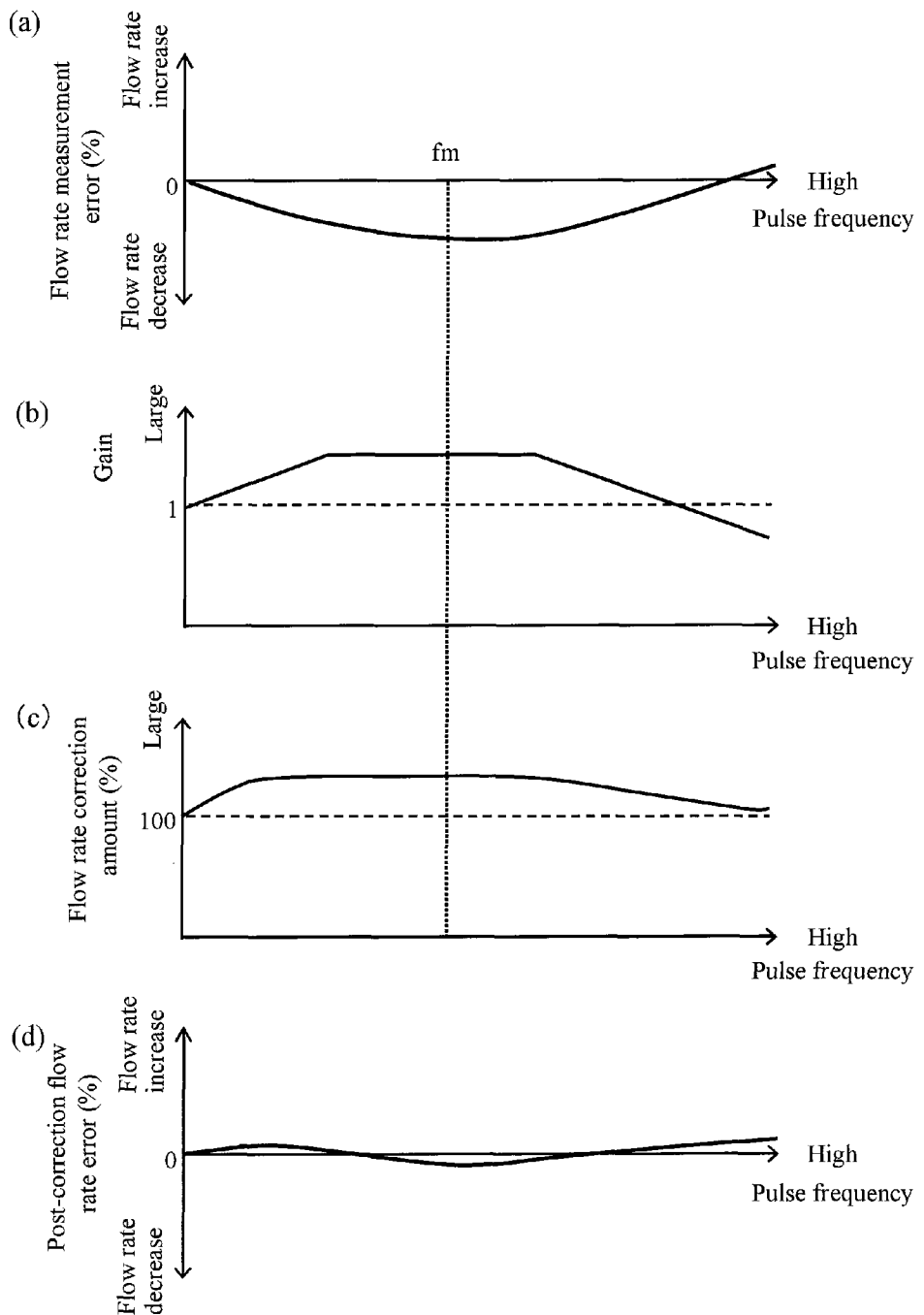
FIG. 19 is a view that illustrates an example of the characteristics of an error and a pulse frequency of an EGR flow sensor that has a bypass passage.

FIG. 19 includes views that illustrate examples of the pulse frequency and error characteristics of an EGR flow sensor that has a bypass passage. FIG. 19($a$) illustrates an example of the pulse frequency and error characteristics of an EGR flow sensor that has a bypass passage. When a pulse frequency is in a range from a low frequency to a medium frequency (fm), errors due to the influence of flow velocity distribution changes in the EGR passage caused by pulse frequency changes are in the direction in which the flow rate decreases as described in the first and second embodiments. When the pulse frequency is a high frequency (>fm), the flow velocity increases in accordance with a rise in the pulse frequency due to the aforementioned inertia effect in the bypass passage, and an error in the direction in which the flow rate falls decreases (because the actual error is a combination of an error in the direction in which the flow rate decreases that is caused by the influence of flow velocity distribution changes as described above, and an error in a direction in which the flow rate increases due to the inertia effect in the bypass passage).

The configuration of the EGR control apparatus of the present embodiment for correcting the aforementioned error characteristics will now be described.

The configuration of an engine system that applies the EGR control apparatus of the present invention is the same as in the first embodiment. The flow of operations of the EGR control apparatus of the present embodiment is the same as in the first embodiment (FIG. 7). A feature of the present embodiment is the method of calculating the EGR gas flow rate in step 130 in FIG. 7. The method of calculating the EGR gas flow rate according to the present embodiment is described hereafter referring to FIG. 20.

In step 300, similarly to the second embodiment, a signal (voltage) of the EGR flow sensor is converted into an EGR gas flow rate to obtain the measured flow rate Qes. In step 410, Qes is subjected to band-pass filter processing. As described later, the band-pass filter processing is performed for the purpose of gain adjustment for correcting errors that change depending on the pulse frequency.

FIG. 19(b) illustrates frequency characteristics of the bandpass filter. According to the example of error characteristics of the EGR flow sensor shown in (a), the absolute value of a measurement error in a direction in which the flow rate decreases is maximum at a certain pulse frequency fm due to the influence of a flow velocity decrease caused by the influence of flow velocity distribution changes in the EGR passage accompanying pulse frequency changes, and the influence of a flow velocity increase caused by an inertia effect in the bypass passage of the EGR flow sensor. The frequency characteristics of the band-pass filter are set in conformity with the above described measurement error characteristics so as to increase the gain in the vicinity of the frequency fm at which the absolute value of the above described error is maximum, and to decrease the gain at other frequencies.

The band-pass filter is a commonly used filter, and is realized by a digital filter for which a transfer function H(z) is represented by the following equation 4.

$$H(z) = \frac{b_0 + b_1 z^{-1} + b_2 z^{-2} + \ldots + b_N z^{-N}}{1 + a_1 z^{-1} + a_2 z^{-2} + \ldots + a_M z^{-M}} \quad \text{[Equation 4]}$$

When the band-pass filter value of Qes is taken as Qesb, the value Qesb is calculated by the following equation 5.

$Qesb = H(z) \times Qes$ [Equation 5]

Figure 20:
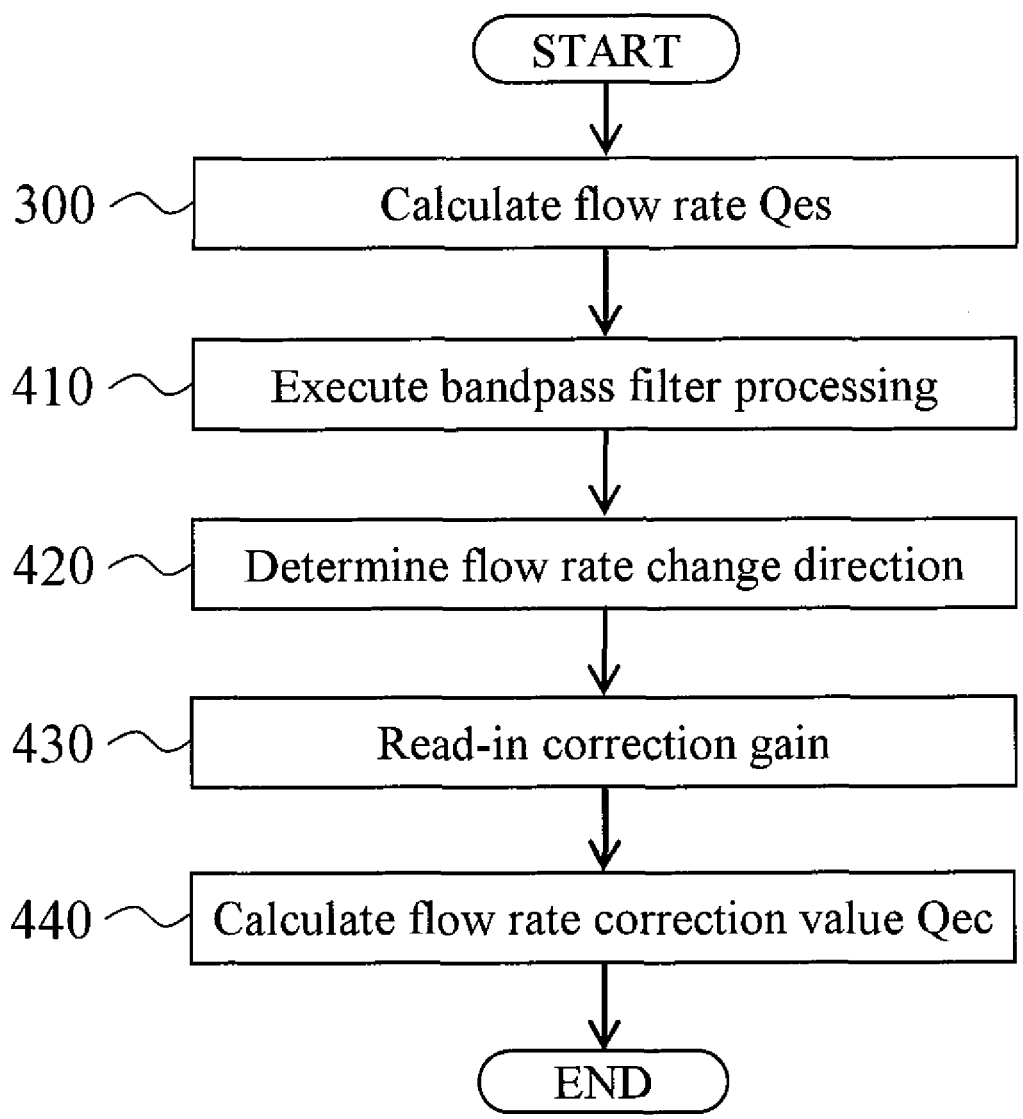
FIG. 20 is a flowchart that illustrates a method of calculating an EGR gas flow rate according to the third embodiment.

In step 420 in FIG. 20, the direction of change in Qesb (increasing direction or decreasing direction) is determined. The method of determining the direction of change in the EGR gas flow rate is the same as in the second embodiment, and an example thereof is described hereunder.

The low-pass filter value Qesbf [n] of Qesb is determined by the following equation. The filter calculation described below is executed for each predetermined period.

$Qesbf[n] = KHP \times (Qesb[n] - Qesbf[n-1]) + Qesbf[n-1]$ [Equation 6]

where,

Qesb[n]: current bandpass filter value of Qes
Qesbf[n−1]: previous Qesbf calculation value
KHP: low-pass filter coefficient The direction of change in the EGR gas flow rate is determined to be the direction in which the flow rate increases when Qesb [n]−Qesbf [n]>0, and is determined to be the direction in which the flow rate decreases when Qesb [n]−Qesbf [n]<0. Setting of the correction gain thereafter and the method of calculating the flow rate correction value are the same as in the second embodiment.

In step 430, the correction gain KH is set in accordance with the flow rate change direction. When the flow rate change direction is the direction in which the flow rate increases, KH is set to the predetermined value KHU. When the flow rate change direction is the direction in which the flow rate decreases, KH is set to the predetermined value KHD. When it is desired to make a correction in the direction in which the flow rate increases in a case where the EGR flow sensor error is in a direction in which the flow rate decreases, a setting is made such that KHU>KHD. When it is desired to make a correction in the direction in which the flow rate decreases in a case where the EGR flow sensor error is in a direction in which the flow rate increases, a setting is made such that KHU<KHD.

In step 440, the flow rate correction value Qec is determined by the following equation or the like. In the equation below, KH×(Qesb−Qesbf) is a correction factor.

$Qec = Qesb + KH \times (Qesb - Qesbf)$ [Equation 7]

When an error of the EGR flow sensor caused by fluctuations in the flow velocity distribution of the EGR passage accompanying EGR gas pulsations according to the above equation is in the direction in which the flow rate decreases, the error is corrected in the direction in which the flow rate increases as illustrated in FIG. 16 of the second embodiment by setting the correction gain KH so that the flow rate correction value Qec rises faster than the measured EGR gas flow rate Qes. When an error of the EGR flow sensor is in a direction in which the flow rate increases, the error is corrected in the direction in which the flow rate decreases by setting the correction gain KH such that the flow rate correction value Qec falls faster than the measured EGR gas flow rate Qes. In this case, the aforementioned band-pass filter is set so that the gain increases in a pulse frequency band in which a measurement error increases, and a change amount in the measured EGR gas flow rate value Qes is amplified. Since the above described correction factor KH×(Qesb−Qesbf) increases as a result, as shown in FIG. 19(c), a flow rate correction amount can be increased in a pulse frequency band in which a measurement error increases. More specifically, when the pulse frequency of the EGR gas flow rate is a lower frequency than the predetermined frequency fm, the gas flow rate correction means increases a correction amount of the EGR gas flow rate in the direction in which the EGR gas flow rate increases in accordance with an increase in the pulse frequency of the EGR gas flow rate. In contrast, when the pulse frequency of the EGR gas flow rate is a higher frequency than the predetermined frequency fm, the gas flow rate correction means decreases a correction amount of the EGR gas flow rate in the direction in which the EGR gas flow rate increases in accordance with an increase in the pulse frequency of the EGR gas flow rate.

The error characteristics when correction of the EGR gas flow rate is executed by the foregoing processing are illustrated in 19(d). It is possible to reduce errors caused by both changes in the flow velocity distribution in the EGR passage accompanying pulse frequency changes, and changes due to an inertia effect (flow velocity increase) in the bypass passage of the EGR flow sensor. As a result, even when there are a plurality of error factors attributable to changes in the pulse frequency, it is possible to control the EGR gas flow rate with a high degree of accuracy and to reduce discharge amounts of PM or NOx in exhaust gases.

According to the first to third embodiments, the flow rate correction means 45 in FIG. 3 is configured to execute processing of a program of the engine control apparatus 22 in FIG. 1. However, the flow rate correction means 45 may be provided as a control apparatus that is separate from the engine control apparatus 20, and the separate control apparatus may be included in the EGR flow sensor (gas flow rate measurement apparatus). More specifically, it should be understood that the scope of the present invention includes not only an EGR flow rate control apparatus of an internal combustion engine that is included in a control apparatus of an internal combustion engine, but also an EGR flow rate control apparatus of an internal combustion engine that is included as gas flow rate correction means (flow rate correction means) that corrects a measurement signal inside an EGR flow sensor (gas flow rate measurement apparatus).

The present invention relates to internal combustion engine control, and can be applied not only to an automobile, but also to a marine engine, an engine for construction equipment, and an engine for a semi-fixed electricity generator.

What is claimed is:

1. An EGR flow rate control apparatus of an internal combustion engine, comprising an EGR flow channel that communicates an exhaust pipe with an intake pipe, a gas flow rate regulating valve that is installed in the EGR flow channel and that regulates an EGR gas flow rate, and a gas flow rate measurement apparatus that is installed on an intake pipe side with respect to the gas flow rate regulating valve in the EGR flow channel and that measures the EGR gas flow rate flowing through the EGR flow channel;

wherein the EGR flow rate control apparatus comprises gas flow rate correction means that corrects the EGR gas flow rate based on a first operating state parameter relating to pressure fluctuations in the intake pipe or the exhaust pipe of the internal combustion engine, and a second operating state parameter relating to a flow channel resistance in the EGR flow channel, wherein the gas flow rate correction means corrects the EGR gas flow rate using, as the first operating state parameter, at least one of a number of revolutions of the internal combustion engine, a load of the internal combustion engine, a target torque, a fuel injection amount, an intake pipe pressure, a throttle valve opening degree, and an exhaust pipe pressure, and using, as the second operating state parameter, at least one of a degree of opening of the gas flow rate regulating valve, the EGR gas flow rate, the number of revolutions of the internal combustion engine, the load of the internal combustion engine, and the target torque, and wherein the gas flow rate correction means increases a correction amount of the EGR gas flow rate in such a manner that the EGR gas flow rate increases as a pulse frequency of the EGR gas flow rate increases.

2. The EGR flow rate control apparatus of an internal combustion engine according to claim 1, wherein the gas flow rate correction means corrects the EGR gas flow rate using, as the first operating state parameter, a number of revolutions of the internal combustion engine and one of a load of the internal combustion engine, a target torque, and a fuel injection amount, and using, as the second operating state parameter, a degree of opening of the gas flow rate regulating valve.

3. The EGR flow rate control apparatus of the internal combustion engine according to claim 1, wherein the gas flow rate correction means corrects the EGR gas flow rate using as the first operating state parameters a number of revolutions of the internal combustion engine and one member of the group comprising a load of the internal combustion engine, a fuel injection amount, and a target torque, and using as the second operating state parameter a degree of opening of the gas flow rate regulating valve.

4. An EGR flow rate control apparatus of an internal combustion engine, comprising an EGR flow channel that communicates an exhaust pipe with an intake pipe, a gas flow rate regulating valve that is installed in the EGR flow channel and that regulates an EGR gas flow rate, and a gas flow rate measurement apparatus that is installed on an intake pipe side with respect to the gas flow rate regulating valve in the EGR flow channel and that measures the EGR gas flow rate flowing through the EGR flow channel;

wherein the EGR flow rate control apparatus comprises gas flow rate correction means that corrects the EGR gas flow rate based on a pulse frequency of the EGR gas flow rate or an amount of change over time in the EGR gas flow rate.

5. The EGR flow rate control apparatus of an internal combustion engine according to claim 4, wherein:

when the pulse frequency of the EGR gas flow rate is a frequency that is lower than a predetermined frequency, the gas flow rate correction means increases a correction amount of the EGR gas flow rate in a direction in which the EGR gas flow rate increases in accordance with an increase in the pulse frequency of the EGR gas flow rate; and when the pulse frequency of the EGR gas flow rate is a frequency that is higher than the predetermined frequency, the gas flow rate correction means decreases the correction amount of the EGR gas flow rate in a direction in which the EGR gas flow rate increases in accordance with an increase in the pulse frequency of the EGR gas flow rate.

\* \* \* \* \*